US005590933A

United States Patent [19]
Andersson

[11] Patent Number: 5,590,933
[45] Date of Patent: Jan. 7, 1997

[54] FOLDING HEADREST

[75] Inventor: Jan Andersson, Trollhättan, Sweden

[73] Assignee: Lear Seating Corporation, Southfield, Mich.

[21] Appl. No.: 521,264

[22] Filed: Mar. 30, 1995

[51] Int. Cl.$^6$ .................... A47C 7/38; B60N 2/48
[52] U.S. Cl. ........................ 297/408; 297/403
[58] Field of Search ..................... 297/391, 403, 297/408

[56] References Cited

U.S. PATENT DOCUMENTS

| 2,502,641 | 4/1950 | Consor. | |
|---|---|---|---|
| 2,812,802 | 11/1957 | Gielow. | |
| 2,828,810 | 4/1958 | Barecki et al. . | |
| 3,779,655 | 12/1973 | Toyota | 403/93 |
| 4,511,180 | 4/1985 | Klaus | 297/408 |
| 4,558,903 | 12/1985 | Takagi | 297/408 |
| 4,596,403 | 6/1986 | Dieckmann et al. | 280/751 |
| 4,640,549 | 2/1987 | Yokota | 297/410 |
| 4,674,792 | 6/1987 | Tamura et al. | 297/408 |
| 4,674,797 | 6/1987 | Tateyama | 297/408 |
| 4,678,232 | 7/1987 | Ishida et al. | 297/408 |
| 4,685,737 | 8/1987 | Deley et al. | 297/403 X |
| 4,796,953 | 1/1989 | Pereira | 297/400 |
| 4,834,456 | 5/1989 | Barros et al. | 297/403 |
| 5,011,225 | 4/1991 | Nemoto | 297/408 |
| 5,011,226 | 4/1991 | Ikeda et al. | 297/403 |
| 5,145,233 | 9/1992 | Nagashima | 297/408 |
| 5,288,129 | 2/1994 | Nemoto | 297/410 |
| 5,346,282 | 9/1994 | De Filippo | 297/395 |

FOREIGN PATENT DOCUMENTS

| 568989 | 1/1959 | Canada . | |
|---|---|---|---|
| 0024687 | 3/1981 | European Pat. Off. . | |
| 2525040 | 12/1976 | Germany . | |
| 3131597 | 2/1983 | Germany . | |
| 3513227 | 10/1985 | Germany . | |
| 110537 | 7/1982 | Japan | 297/408 |
| 57-155128 | 9/1982 | Japan . | |
| 4005918 | 1/1992 | Japan | 297/408 |
| 2176098 | 12/1986 | United Kingdom . | |

Primary Examiner—Peter R. Brown
Attorney, Agent, or Firm—Howard & Howard

[57] ABSTRACT

A headrest support assembly (24) provides for a headrest frame (14) to be pivoted relative to a seatback (10) along a single pivot axis (28). The headrest (12) is adjustable into a plurality of support positions (30) and foldable into a non-support position (32) to enhance a driver's ability to see out the windows of a vehicle. The mechanism (60, 62) for adjusting the orientation of the headrest in the support position acts independently of the mechanism (47) for moving the headrest into the non-support position.

17 Claims, 3 Drawing Sheets

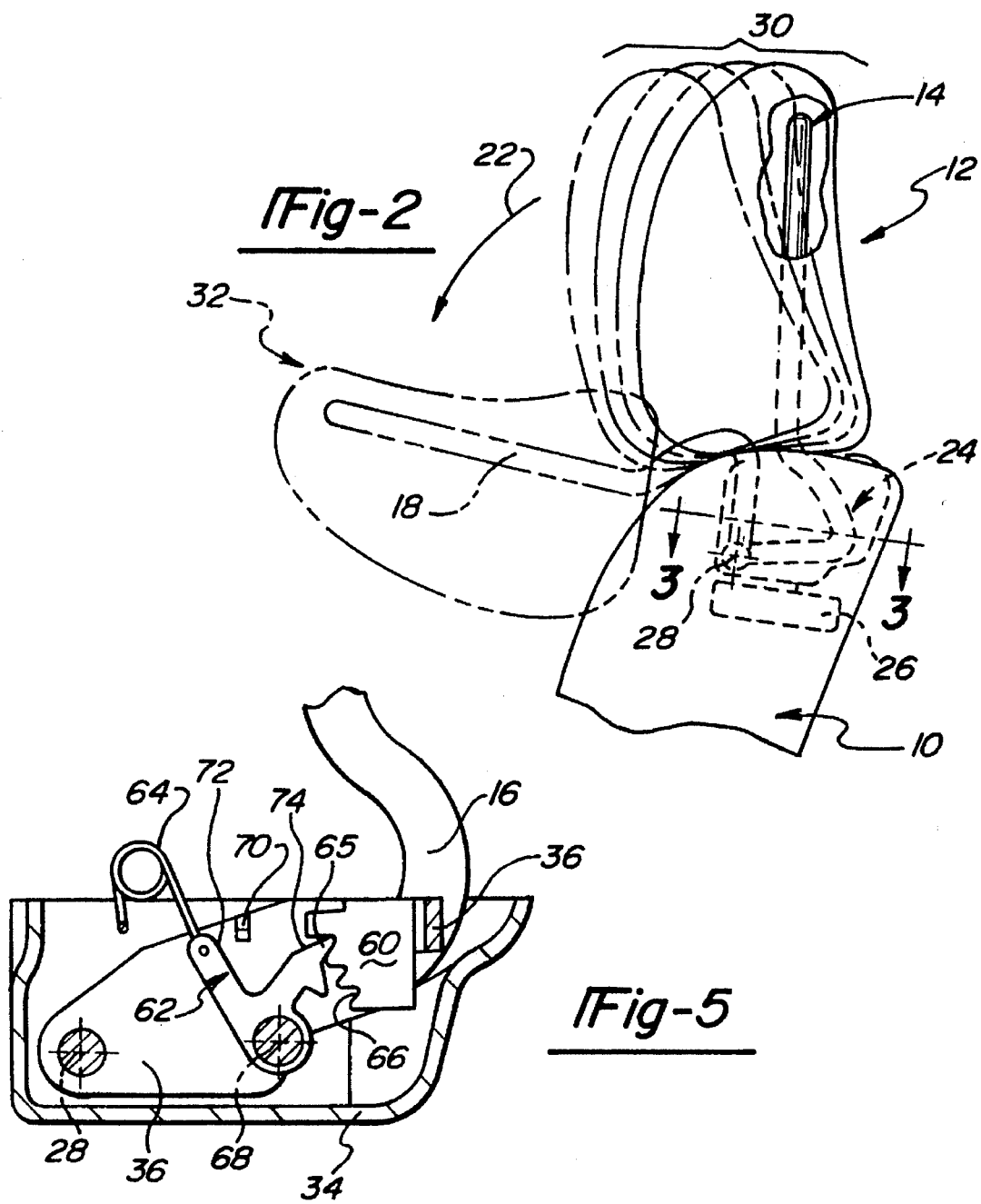

5,590,933

FOLDING HEADREST

TECHNICAL FIELD

This invention relates to vehicle seat headrests and, more specifically, to a headrest support mechanism that enables the headrest to be adjusted between a plurality of support positions and to be independently moved into a folded, non-support position relative to the seatback.

BACKGROUND OF THE INVENTION

A variety of vehicle seat headrests are utilized in modern day vehicles. More recently, headrests have been provided as additional comfort and safety features for passengers sitting in the rear seat of the vehicle. Although the inclusion of headrests on a rear seat enhances the passenger's comfort and safety, a driver's view through the rear window of the vehicle is typically obstructed by the presence of the headrest.

It has been suggested, therefore, to provide a headrest that is foldable relative to the seatback when it is not in use such that the headrest no longer obstructs the driver's vision through the rear window. One such foldable headrest is shown in U.S. Pat. No. 5,145,233 issued to Hideo Nagashima. Such headrests are useful, however, there are several shortcomings and drawbacks associated with them. First, most foldable headrests include complex gearing mechanisms for enabling the headrest to be moved into a folded, non-use position. Such complex gearing mechanisms undesirably increase the complexity of the vehicle seat and are not easily adapted for use within most conventional vehicle seats. Further, the complex gearing mechanisms typically require extensive customizing work in designing the vehicle seat. The gearing mechanisms are also cumbersome and subject to mechanical breakdown. Further, such complex gearing mechanisms increase the weight of a vehicle, which is seen as particularly undesirable where fuel economies are important.

A significant shortcoming associated with conventional foldable headrests is that the orientation of the headrest relative to the seatback is typically not adjustable independent of the gearing mechanism used for moving the headrest into the non-use position. This is undesirably limiting because different passengers may desire a variety of orientations of the headrest relative to the seatback for greater comfort.

Therefore, it is desirable to provide a headrest that overcomes the shortcomings and drawbacks discussed above. This invention provides a headrest that is foldable into a non-use position, which does not require a complex gearing mechanism. Further, this invention provides a headrest that has an adjustability feature that is independent of the mechanism for moving the headrest into a non-use position.

SUMMARY OF THE INVENTION

In general terms, this invention is a vehicle seat assembly that has a generally horizontally disposed support surface and a backrest that has a top end distal from the support surface. The assembly includes a headrest mounting member that is connected to the backrest adjacent the top end of the backrest. A headrest is pivotally coupled to the mounting member for pivotal movement about a pivot axis relative to the backrest. The headrest is pivotable into a plurality of use positions, wherein the headrest is an extension of the backrest and a non-use position, wherein the headrest is generally perpendicular to the backrest. The seat assembly also includes an adjusting means for adjusting the headrest between the plurality of use positions. The seat assembly is characterized by release means interconnecting the adjusting means and the headrest for releasing the adjusting means from the headrest to allow the headrest to pivot about the pivot axis, independent of the adjusting means, to the non-use position.

BRIEF DESCRIPTION OF THE DRAWINGS

Various other features and advantages of this invention will become readily apparent from the following detailed description of the preferred embodiments when considered in connection with the accompanying drawings, the following being a brief description of the latter.

FIG. 2 is a side planar view of the embodiment of FIG. 1 illustrating the variable positioning of the headrest relative to the seatback.

FIG. 5 is a partial cross-sectional view taken along the line 5—5 of FIG. 3.

DETAILED DESCRIPTION OF THE PREFERRED EMBODIMENT

Figure 1:
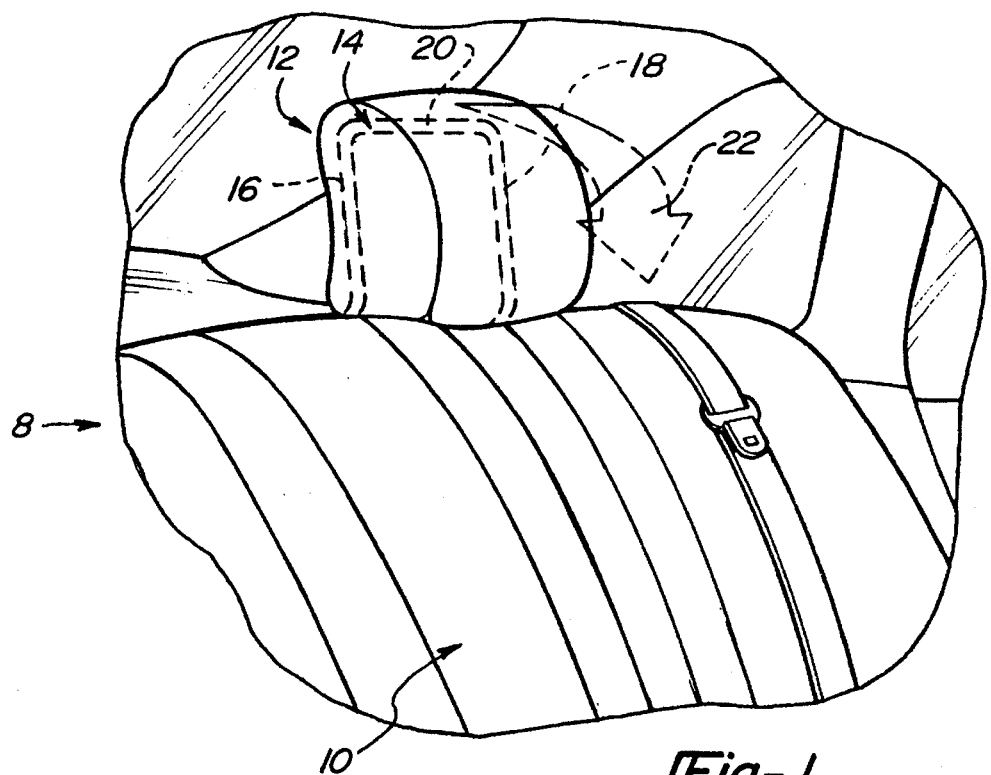
FIG. 1 is a perspective view of a vehicle seat including a foldable headrest designed in accordance with this invention.

FIG. 1 illustrates a vehicle seat assembly generally indicated at 8 having seatback 10 and a headrest 12 connected to the top of the seatback. Head rest 12 includes headrest frame 14, which is made up of vertical supports 16 and 18 and crossbar 20. Headrest 12 is foldable relative to seatback 10 from the illustrated use position where headrest 12 is an extension of seatback 10, into a non-use position by moving headrest 12 according to direction arrow 22.

FIG. 2 illustrates, in planar view, the various achievable positions of headrest 12 relative to seatback 10. Headrest support assembly, generally indicated at 24, preferably is coupled to seat portion 26 such that headrest 12 is pivotally mounted relative to seatback 10. Seat portion 26 can be any solid member within a conventional seatback that is suitable for supporting support assembly 24 as will be more fully described below. As can be seen in FIG. 2, headrest 12 is pivotable about pivot axis 28 into a plurality of use or support positions 30. Further, headrest 12 is pivotable about axis 28 into the non-use or non-support position indicated at 32. As can be appreciated from the illustration, when headrest 12 is in the nonsupport position, it is generally perpendicular to seatback 10. A perpendicular relationship is not required, however, it is preferred that headrest 12 is clear of a vehicle driver's line of sight through the rear window of the vehicle.

Figure 3:
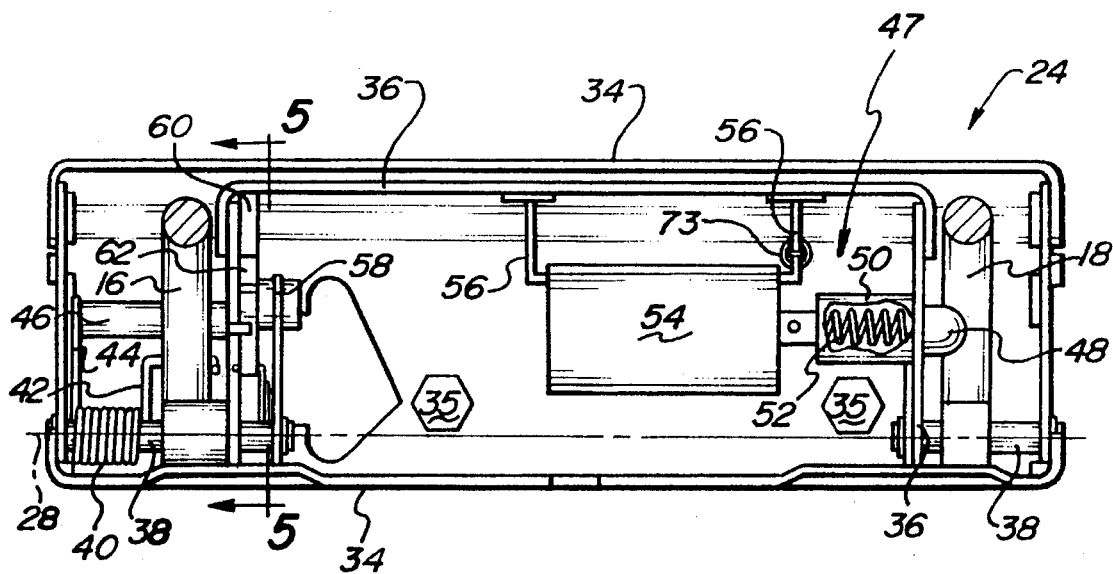
FIG. 3 is a partial cross-sectional view taken along the line 3—3 of FIG. 2.
Figure 4:
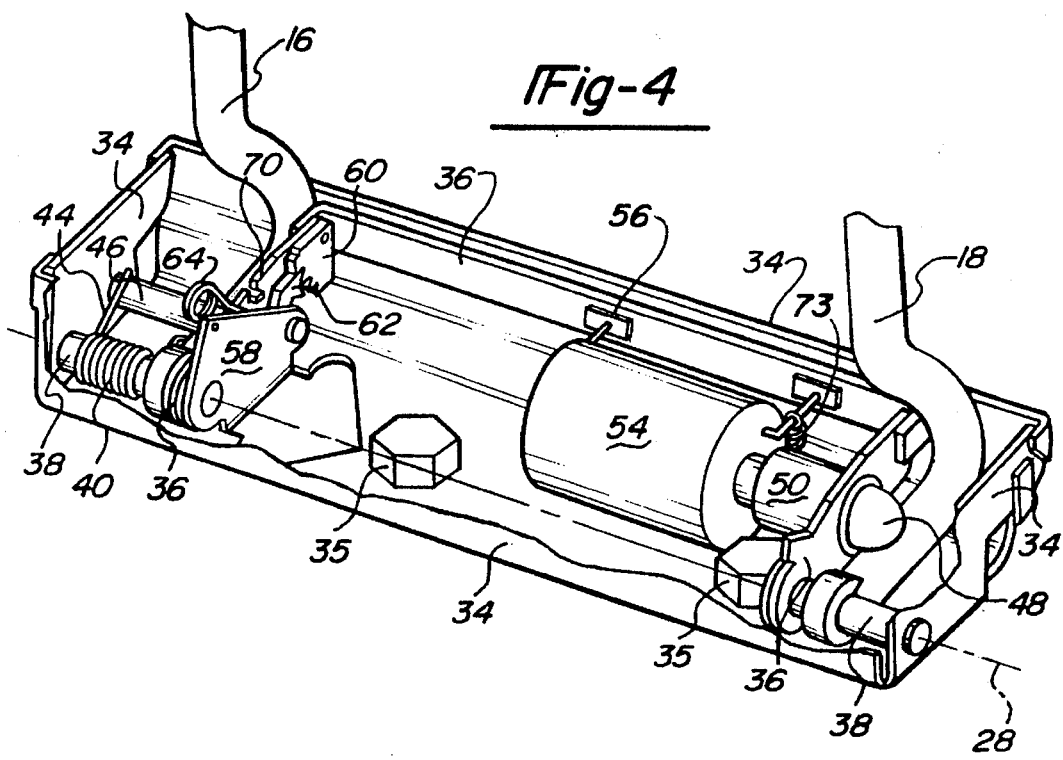
FIG. 4 is a partial cut-away, perspective view of the embodiment illustrated in FIG. 3.

FIG. 3, which is a partial sectional view taken along the line 3—3 of FIG. 2, and FIG. 4 illustrate details of the preferred embodiment. Support assembly 24 includes mounting member 34, which is preferably mounted onto seat portion 26 through bolts 35. Support assembly 24 also includes bracket 36, which is pivotally connected to mounting member 34. Bracket 36 preferably is connected to mounting member 34 by being mounted upon shafts 38 such that bracket 36 pivots about pivot axis 28 relative to mounting member 34.

Vertical supports 16 and 18 of headrest frame 14 are rotatably mounted upon shafts 38 such that headrest 12 pivots about pivot axis 28 relative to mounting member 34 and, therefore, seatback 10.

Spring 40 is preferably provided about one of the shafts 38 and serves as a means for biasing headrest 12 into the non-use position 32. Spring 40 preferably includes a first spring end 42 that abuts one edge of vertical support member 16. A second spring end 44 abuts stop member 46, which is fixedly coupled to bracket 36. When headrest 12 is in a use or support position, spring 40 is torsionally compressed because spring ends 42 and 44 are abutting against the headrest frame and stop member 46, respectively. Therefore, spring 40 tends to urge headrest 12 into the non-use, folded position 32.

Release means, generally indicated at 47, operate to selectively permit headrest 12 to move into the non-use position. Latching member 48 is provided preferably to abut one surface of vertical support member 18 and, thereby to maintain headrest 12 in the support position. Latching member 48 preferably moves axially through a hole in bracket 36 and within generally cylindrical housing 50. Spring 52 is provided within housing 50 to bias latching member 48 into a position where it abuts one surface of vertical support member 18 as illustrated. The terminal end of latching member 48 that is outside of cylindrical housing 50 is preferably rounded or chamfered as illustrated. When support member 18 is engaged by latching member 48, bracket 36 is coupled with headrest 12 such that bracket 36 and headrest 12 pivot in unison about axis 28.

Motor 54, which is preferably supported on bracket 36 by mounting pieces 56, is coupled to latching member 48. Motor 54 preferably comprises a solenoid actuator or magnet armature that moves latching member 48 against the bias of spring 52 when motor 54 is energized. As motor 54 draws latching member 48 to the left (according to the drawings), headrest 12 is moved into the non-use position by the force of spring 40. Accordingly, latching member 48, spring 52 and motor 54 serve as a means for releasing headrest 12 from the remainder of the support assembly to allow headrest 12 to pivot into the non-use position.

Motor 54 preferably is actuated by a remotely located switch (not shown). For example, a button or switch can be provided on the dashboard on the driver's side of the vehicle such that the driver can activate motor 54 and, thereby move headrest 12 into the non-use position in order to obtain an unobstructed view through the rear window of the vehicle. The connection between the remotely located switch and motor 54 can be through hard-wiring or other conventional electrical couplings.

Attention will now be turned to the means for adjusting headrest 12 into the plurality of use positions 30. As can best be seen in FIGS. 4 and 5, mounting member 34 includes a raised leaf portion 58. Ratchet 60 preferably is fixedly coupled to bracket 36. Pawl 62 is connected to leaf portion 58. Pawl spring 64 biases one end 65 of pawl 62 into one of a plurality of notches 66 on ratchet 60. Ratchet 60 and pawl 62 serve as an adjuster for placing headrest 12 into the plurality of use positions 30.

A user can manually manipulate headrest 12 relative to seatback 10 in order to change the orientation of headrest 12 and move it between the plurality of support positions. As a user grasps headrest 12 and pulls it forward, for example, bracket 36 and headrest frame 14 pivot about axis 28 relative to mounting member 34. Since ratchet 60 is fixed to bracket 36, such pivoting action results in engaging end 65 on pawl 62 moving from one notch 66 into an adjacent notch. Each notch 66 on ratchet 60 corresponds to one of the adjusted use positions 30 illustrated in FIG. 2, for example. Pawl 62 pivots about axis 68 (shown in FIG. 5) as such an adjustment is made.

In the most preferred embodiment, the adjuster includes a reset feature. Assume that the right-most support position illustrated in FIG. 2 is a first adjusted support position. Further, assume that the left-most adjusted support position (illustrated in phantom) is a last adjusted position. As bracket 36 pivots about axis 28, ratchet 60 moves relative to pawl 62. Pawl 62 pivots about axis 68 and, because there is some play in the bias provided by pawl spring 64, engaging portion 65 on pawl 62 moves into an adjacent notch 66. This action can be successively repeated in order to adjust the use position of headrest 12. Once the last position (or left-most, according to the drawing) is established, upon further movement of headrest 12 in a forward direction, spring 64 operates to move pawl end 65 away from ratchet 60 until pin 70 abuts pawl arm 72. Headrest 12 is then moveable, and preferably biased by spring 73, which urges bracket 36 toward the bottom (according to the drawing) of cassette 34, into the first support position. As headrest 12 moves into the first support position, cam surface 74 facilitates the movement of engaging end 65 into the notch 66 that corresponds to the first use position.

As can be appreciated, as headrest 12 is moved into one of the plurality of support positions 30, latching member 48 and motor 54 move in unison with bracket 36. Accordingly, as the orientation of headrest 12 is changed into a new support position, latching member 48 operates to maintain headrest 12 in a use position against the bias of spring 40.

Therefore, a seat designed in accordance with this invention includes headrest 12 that is coupled to headrest mounting member 34 such that headrest 12 pivots about pivot axis 28 relative to seatback 10. Headrest 12 is pivotable into a plurality of use positions 30 through means 60, 62 for adjusting the orientation of the headrest relative to seatback 10.

The inventive seat is characterized by release means 47 interconnecting headrest 12 and adjusting means 60, 62 that releases the adjusting means from headrest 12 to allow headrest 12 to pivot about pivot axis 28 into the non-use position 32, independent of the adjusting means 60, 62.

Figure 6:
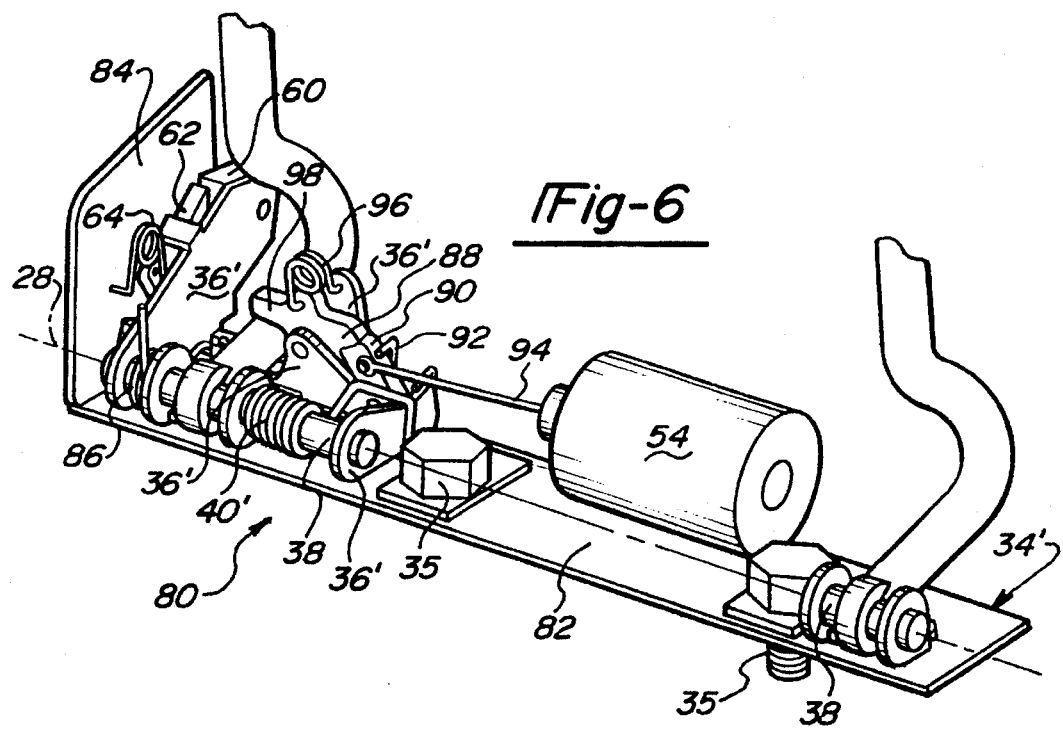
FIG. 6 is a perspective view of an alternative embodiment of this invention.

FIG. 6 illustrates an alternative embodiment of the inventive headrest support assembly. Like reference numerals in FIG. 6 refer to like elements as illustrated and discussed above with respect to FIGS. 1 through 5. Mounting member 34' includes bottom plate 82 and side plate 84. Bottom plate 82 and side plate 84 preferably are integrally formed as a single piece mounting member member. Bracket 36' is physically configured significantly differently than, although its operation is essentially identical to, bracket 36 of the previously described embodiment. Bracket 36' pivots relative to mounting member 34' as headrest 12 is moved into the plurality of support positions. Bracket spring 86 is provided in the embodiment of FIG. 6 in order to bias bracket 36' into the first use position when headrest 12 is moved from the non-use position back into a support position. Apart from the differences apparent from the illustration, the function of cassette 34' and bracket 36' correspond to that described above with respect to the preferred embodiment of this invention.

Another difference between the embodiment of FIG. 6 and the preferred embodiment is found in latching member 88. Latching member 88 serves as a means for maintaining the headrest in a support position, much like latching member 48 of the previously described embodiment. Latching member 88 is maintained within a latching position by locklatch 90, which is biased into the locking position by locklatch spring 92.

Latching member 88 is moved out of a latching position when pull member 94 is driven by motor 54, thereby moving locklatch 90 to the right (according to the drawing). Upon such movement, latching spring 96 biases locklatch 90 away from vertical support 16 and spring 40' urges headrest 12 into the non-support position. The activation of motor 54 in order to disengage latching member 88 preferably is accomplished by activating a remotely located switch, such as a push button on the driver's side of the vehicle dashboard or control panel.

Latching member 88 preferably includes an abutment surface (not shown in the drawing) that engages a portion of vertical support 16 as headrest 12 is returned into the support position such that arm 98 on latching member 88 is moved back into the latching position. As latching member 88 is moved into the latching position, locklatch spring 92 biases locklatch 90 into the position to engage latching member 88 such that headrest 12 is maintained in the support position.

Apart from the differences just described, the embodiment of FIG. 6 operates in accordance with the description of the preferred embodiment described above.

The foregoing description is exemplary rather than limiting in nature. Variations and modifications of the disclosed embodiments will become apparent to those skilled in the art that do not depart from the purview and spirit of this invention. Accordingly, the scope of this invention is to be limited only by the appended claims wherein reference numerals are provided merely for convenience and are not to be construed as limiting in any way.

What is claimed is:

1. A vehicle seat assembly (8), comprising:

a generally horizontally disposed support surface and a backrest having a first end distal from said support surface;

a headrest mounting member (34) connected to said backrest (10) adjacent said backrest first end;

a headrest (12) pivotally coupled to said mounting member (34) for pivotal movement about a pivot axis (28) relative to said backrest (10) between a plurality of use positions (30) wherein said headrest (12) is an extension of said backrest (10) and a non-use position (32) wherein said headrest (12) is generally perpendicular to said backrest (10);

adjusting means (60, 62) operatively connected to said headrest (12) for adjusting the position of said headrest (12) about said pivot axis (28) between said plurality of use positions (30); and a bracket (36) pivotally connected to said mounting member (34) for pivotal movement about said pivot axis (28); said adjusting means including a first member (60) disposed on said bracket (36) and moveable therewith about said pivot axis (28); and release means disposed on said bracket (36) and moveable therewith about said pivot axis (28) wherein said release means releasably interconnects said bracket and said headrest, for releasing said bracket and said adjusting means from said headrest, to allow said headrest to pivot about said pivot axis independently of said adjusting means to said non-use position.

2. The assembly of claim 1, wherein said adjusting means includes a second member (62) supported on said mounting member (34) that cooperatively engages said first member (60).

3. The assembly of claim 2, wherein said release means (47) includes a latching member (48) moveable between an abutment position for abutingly engaging a portion (18) of said headrest (12), when said headrest (12) is in one of said plurality of use positions (30), and a non-abutment position.

4. The assembly of claim 3, wherein said release means (47) further includes biasing means (52) for biasing said latching member (48) into said abutment position.

5. The assembly of claim 4, wherein said release means (47) further includes a linear actuator (54), coupled to said latching member (48), for selectively moving said latching member (48) axially against the bias of said biasing means (52).

6. The assembly of claim 5, wherein said linear actuator (54) is electrically activated whereby said release means may be remotely activated.

7. The assembly of claim 6, further comprising moving means (40) operatively disposed between said headrest and said mounting member (34) for moving said headrest into said non-use position.

8. The assembly of claim 7, wherein said moving means comprises a spring (40) that biases said headrest into said non-use position.

9. The assembly of claim 1, wherein said first member comprises a ratchet (60), having a plurality of notches (66).

10. The assembly of claim 9, wherein said second member comprises a pawl (62) pivotally supported on said mounting member (34) for pivotal movement about a second pivot axis (68), said pawl (62) having an engaging end (65) that engages and moves between said plurality of notches (66) on said ratchet (60) as said headrest (12) moves between said plurality of use positions (30).

11. The assembly of claim 10, wherein said plurality of use positions (30) include a first and last position and wherein said adjusting means (60, 62) further includes a spring (64), supported on said mounting member (34), for releasing said pawl engaging end (65) out of engagement with said ratchet notches (66) after said headrest (12) is moved out of said last position in a direction away from said first position.

12. A headrest support assembly (24) for a headrest (12) that is moveable between a plurality of support positions (30) and a non-support position (32) that is generally perpendicular to the support position, comprising:

a mounting member (34) adapted to be connected to a seatback (10);

a bracket (36) pivotally connected to said mounting member (34) for pivotal movement about a pivot axis (28);

an adjuster (60, 62) operatively connected to said bracket (36) for adjusting the headrest (12) between the plurality of support positions (30); and characterized by a latching member (48) supported on said bracket (36) for pivotal movement about said pivot axis (28) adapted to engage and maintain the headrest (12) in a support position;

an actuator (54) operatively coupled to said latching member (48) for releasing said latching member (48) from the headrest (12) to allow the headrest to pivot about said pivot axis (28) into the non-support position (32) independent of said adjuster (60, 62); and said adjuster (60, 62) including a first member (60) mounted on said bracket (36) and a second member

(62) supported on said mounting member (34), said bracket (36) and said first member (60) pivoting about said pivot axis (28) as the headrest is adjusted between the plurality of use positions (30).

13. The assembly of claim 12, wherein said actuator (54) is supported on said bracket (36) for pivotal movement about said pivot axis (28).

14. The assembly of claim 13, further comprising biasing means (52) for biasing said latching member (48) into an engagement position for engaging a portion (18) of the headrest (12) such that said bracket (36) and the headrest (12) pivot in unison about said pivot axis (28) as the headrest is adjusted between said plurality of use positions (30).

15. The assembly of claim 14, wherein said actuator (54) is coupled to said latching member (48) such that said actuator (54) moves said latching member (48) against the bias of said biasing means (52).

16. The assembly of claim 15, wherein said actuator (54) comprises an electrically activated linear actuator that may be remotely activated.

17. The assembly of claim 12, further comprising biasing means (40) supported on said mounting member (34) for biasing the headrest (12) into the non-use position (32).

\* \* \* \* \*